US007922792B1

(12) United States Patent
Soong et al.

(10) Patent No.: US 7,922,792 B1
(45) Date of Patent: Apr. 12, 2011

(54) METHOD FOR SEQUESTERING $CO_2$ AND $SO_2$ UTILIZING A PLURALITY OF WASTE STREAMS

(75) Inventors: Yee Soong, Monroeville, PA (US); Douglas E. Allen, Salem, MA (US); Chen Zhu, Monroe County, IN (US)

(73) Assignee: U.S. Department of Energy, Washington, DC (US)

( * ) Notice: Subject to any disclaimer, the term of this patent is extended or adjusted under 35 U.S.C. 154(b) by 501 days.

(21) Appl. No.: 12/046,714

(22) Filed: Mar. 12, 2008

Related U.S. Application Data

(60) Provisional application No. 60/894,467, filed on Mar. 13, 2007.

(51) Int. Cl.
*B01D 53/14* (2006.01)
(52) U.S. Cl. .............................. 95/232; 95/235; 95/236
(58) Field of Classification Search .............. 95/235, 95/232, 236; 96/242, 290, 352, 416; 423/239.1, 423/531
See application file for complete search history.

(56) References Cited

U.S. PATENT DOCUMENTS

| | | | | |
|---|---|---|---|---|
| 4,031,185 A * | 6/1977 | Akimoto et al. | ........... | 423/239.1 |
| 4,085,194 A * | 4/1978 | Otani et al. | ............. | 423/243.03 |
| 5,747,104 A * | 5/1998 | Baebel | .......................... | 427/136 |
| 6,162,855 A * | 12/2000 | Langley | ........................ | 524/437 |
| 6,313,368 B1 * | 11/2001 | Bhat | .............................. | 588/313 |
| 7,628,847 B2 * | 12/2009 | Pope et al. | ....................... | 96/242 |
| 7,753,618 B2 * | 7/2010 | Constantz et al. | .............. | 404/44 |
| 7,754,169 B2 * | 7/2010 | Constantz et al. | ............ | 423/165 |
| 2005/0034600 A1 * | 2/2005 | Ravary et al. | .................... | 95/235 |
| 2008/0175777 A1 * | 7/2008 | Suchak et al. | ............. | 423/239.1 |

OTHER PUBLICATIONS

Lico, , et al. "Methods for collection and analysis of geopressurized geothermal and oil field waters" (US Geological Survey Water Supply) Paper 2194, 1982, p. 21.
Department of Energy, DOE/SC/FE-1 "Carbon Sequestration Research and Development", Dec. 1999.
Smith, et al."Reduction—Prospects for Coal" IEA Coal Research, CC/26, Dec. 1999, International Energy Agency, Coal Research, London, uk, (Abstract).
Kharka, et al. Can produced water be reclaimed? pro 5th intern. Petrol. Environm. Conf. Oct. 20-23, Albuquerque, NM.
Bethke, C.M. "Geochemical Reaction Modeling: Concepts and Applications" Oxford University Press, 397 p. (1996), (Book Cover).
White, et al. "Separation and Capture of CO2 from large stationary sources . . . " Journ. Air & Waste Manage. Assoc., 53, 645-715 (2003).
Allen, et al."Modeling carbon dioxide sequestration in saline acquifers" Fuel Process Tech, vol. 86, 1569-1580.
Soong, et al. "Experimental simulation Study on Mineral Trapping of CO2 with Brine." Energy Conversion and Management, 45, 1845-1859.
Palandri, et al. "Experimental Studies of CO2 sequestration in ferric iron-bearing sediments." USGS, Menlo Park, CA, 2004.
Aluminum Association, "Technology Roadmap for Bauxide Residue Treatment and Utilization," Workshop, Energetics, Feb. 2000, Washington DC.

* cited by examiner

*Primary Examiner* — Duane Smith
*Assistant Examiner* — Ives Wu
(74) *Attorney, Agent, or Firm* — Joy Alwan; Brian J. Lally; John T. Lucas

(57) ABSTRACT

A neutralization/sequestration process is provided for concomitantly addressing capture and sequestration of both $CO_2$ and $SO_2$ from industrial gas byproduct streams. The invented process concomitantly treats and minimizes bauxite residues from aluminum production processes and brine wastewater from oil/gas production processes. The benefits of this integrated approach to coincidental treatment of multiple industrial waste byproduct streams include neutralization of caustic byproduct such as bauxite residue, thereby decreasing the risk associated with the long-term storage and potential environmental of storing caustic materials, decreasing or obviating the need for costly treatment of byproduct brines, thereby eliminating the need to purchase CaO or similar scrubber reagents typically required for $SO_2$ treatment of such gasses, and directly using $CO_2$ from flue gas to neutralize bauxite residue/brine mixtures, without the need for costly separation of $CO_2$ from the industrial byproduct gas stream by processes such as liquid amine-based scrubbers.

7 Claims, 5 Drawing Sheets

| Run # | pH initial | T, °C | Peo2,% Initial | Peo2,% final | Time (hr) | pH final | CO2, Mole reacted | CO2 kg/kl reacted | SO2 initial ppm | SO2 final ppm |
|---|---|---|---|---|---|---|---|---|---|---|
| 405 | 9.96 | 20 | 15.53 | 8.73 | 1 | 6.35 | 0.0780 | 3.432 | 542 | 6.9 |
| 406 | 10.01 | 20 | 15.04 | 9.28 | 1 | 6.29 | 0.0793 | 3.489 | 535 | 25 |
| 407 | 12.26 | 140 | 12.325 | 2.58 | 4.5 | 8.97 | 0.137 | 6.028 | 540 | 0.65 |
| 408 | 9.98 | 140 | 13.035 | 4.66 | 4.25 | 7.16 | 0.162 | 7.128 | 540 | 0.15 |
| 409 | 9.95 | 140 | 16.025 | 8.21 | 5.5 | 6.43 | 0.179 | 7.876 | 636 | 0.44 |
| 410 | 10.09 | 140 | 100 | 100 | 5.25 | 7.01 | 0.0937 | 4.123 | — | — |

FIG. 4

| Run # | Reactant mixture description | Reactant Gas | Pressure (psi) | Temp (°C) | Initial pH | Mixer Speed (rpm) | Rxn. Time (h) |
|---|---|---|---|---|---|---|---|
| 405 | brine+bauxite res. (54.17%/45.83%) | FG | 402 | 20 | 9.96 | 1500 | 1 |
| 406 | Brine + bauxite liquid (47.07%/52.93%) | FG | 401 | 20 | 10.01 | 1500 | 1 |
| 407 | bauxite residue | FG | 561 | 140 | 12.26 | 1500 | 4.5 |
| 408 | bauxite residue + brine (80%/20%) | FG | 566 | 140 | 9.98 | 1500 | 4.25 |
| 409 | bauxite residue + brine (60%/40%) | FG | 586 | 140 | 9.95 | 1500 | 5.5 |
| 410 | bauxite residue/brine (80%/20%) | CO2 | 598 | 140 | 10.09 | 1500 | 5.25 |

FIG. 5

METHOD FOR SEQUESTERING CO₂ AND SO₂ UTILIZING A PLURALITY OF WASTE STREAMS

PRIORITY

This application claims priority from provisional application 60/894,467 filed Mar. 13, 2007.

CONTRACTUAL ORIGIN OF THE INVENTION

The United States Government has rights in this invention pursuant to an employer/employee relationship between the U.S. Department of Energy (DOE) and the inventor, Yee Soong.

BACKGROUND OF THE INVENTION

1. Field of the Invention

The present invention relates to a method for utilizing three waste streams to sequester flue gas constituent, and more particularly the present invention relates to a method for sequestering carbon dioxide and sulfur dioxide contained in flue gas by contacting the emissions with waste water brine pretreated with bauxite residue.

2. Background of the Invention

Many researchers suspect a link between global climate change and atmospheric concentrations of carbon dioxide ($CO_2$). Studies have shown a correlation between a rise in atmospheric $CO_2$ and increasing mean global temperature since the advent of the industrial era. In order to decrease the impact of $CO_2$ on global climate, several strategies are under development that will potentially remove $CO_2$ from the atmosphere or decrease $CO_2$ emissions.

Principle modes for carbon management include: (i) increasing the efficiency of energy conversion; (ii) using low-carbon or carbon-free energy sources; and (iii) capturing and sequestering anthropogenic $CO_2$ emissions. The latter strategy termed "$CO_2$ sequestration" permits continued use of fossil fuels for the generation of electric power while ensuring $CO_2$ emission reductions, and has gained increased attention in recent years. Various $CO_2$ sequestration options include oceanic-, terrestrial-, and geologic-containment, and the use of advanced biological- and chemical-approaches. Each of these options has significant technical and economic hurdles that need to be addressed before being considered for full-scale application.

Geologic sequestration involves the capture of $CO_2$ from large point sources (such as fossil fuel-fired power plants) and the long-term storage of $CO_2$ in underground, brine-bearing geologic formations. Brine is an attractive reactant in $CO_2$ sequestration schemes inasmuch as 20-30 billion barrels of saline wastewater are produced annually in the United States as a byproduct of enhanced oil and gas recovery. About 65% of this water is reinjected into reservoirs for pressure maintenance, and the remaining water is treated and discharged into surface water. In Pennsylvania, for example, a typical treatment cost for this wastewater can be as high as $3.00/barrel. However, the pH of subsurface aquifer brines is typically low (approximately 3-5). The primary issue affecting solubility trapping is the limited absorptive capacity of brine. This low pH precludes dissolution of $CO_2$ and prevents carbonate formation.

Over 70 million tons of bauxite residue are generated annually when aluminum is extracted from the principal ore called bauxite (Aluminum Association, 2000). The residue is primarily comprised of iron and titanium oxides, silica, calcium carbonate, and unrecoverable alumina and caustic soda (NaOH), and, as such, is highly alkaline. The pH of the liquid reaches values as high as 13.5 (the hazardous threshold is 12.5) and the solids and solid surfaces also contain high alkalinity. The caustic nature of the byproduct yields concerns of long-term environmental liability and impact because leakage of this alkaline liquid from impoundments into groundwater aquifers can result in mobility of several constituents of concern, including iron, aluminum, and hydroxide ion.

Worldwide, there are about 200 million tons of bauxite residues, the vast majority of which is stored in tailings ponds. Numerous methods have been attempted to mitigate the potential environmental impacts of the residue, including washing with seawater (Ward and Summers, 1993; Menzies et al., 2004), land application as a soil amendment (Lombi et al., 2002; Hughes, 2003), beneficial use as an admixture in cementitious materials (Singh et al., 1997; Zhihua et al., 2003), treatment of acidic mine drainage (Doye and Duchesne, 2003), and sewage effluent treatment (Lopéz et al., 1998). However, large-volume, economically-viable applications for dealing with bauxite residue have, as yet, not been identified.

The primary source of alkalinity in bauxite residue is NaOH remaining from the Bayer extraction of alumina. Other, more resilient, sources of alkalinity also impact the effectiveness of bauxite residue carbonation. Nikraz (2007) reported in *Journal of Materials in Civil Engineering* 19, Issue 1, pp. 2-9 that the effectiveness of carbonization treatment of the byproduct slurry is a function of the level of solid alkalinity present in the slurry as tri-calcium aluminate (TCA-6). However, TCA-6 is slow to react to be of any value as a sequestration reagent.

In geological sequestration, alkalinity buffering can be accomplished through mineral reaction within the host rocks, as noted by one of the inventors in Allen et al., *Fuel Process. Tech.* 86, pp 1569-1580 (2005). However, due to sluggish reaction rates, these mineral reactions are likely to take a long time.

A need exists in the art for above-ground carbon sequestration methods of $CO_2$ and/or $SO_2$ by utilizing secondary production streams such as caustic bauxite tailings and acidic brine liquors. The methods should result in the treatment of the oxides as limiting reagents, with a concomitant decrease in volume and decrease in toxicity of all waste streams involved.

SUMMARY OF THE INVENTION

It is an object of the present invention to provide a method for sequestering carbon dioxide and/or sulfur dioxide that overcomes many of the disadvantages of the prior art.

Another object of the present invention is to provide a method for simultaneously reducing three unrelated waste streams. A feature of the invention is utilizing flue gas containing $CO_2$ and/or $SO_2$, utilizing bauxite, and utilizing brine wastewater. An advantage of the invention is that all three waste streams are minimized for long term sequestration.

Yet another object of the present invention is to neutralize bauxite residue by utilizing two other and unrelated waste streams. A feature of the invention is reacting the bauxite with oil field brine and carbon dioxide. An advantage of the invention is decreasing the potential impact of the caustic residue by lowering its pH to at least 7.

Still another object of the present invention is to decrease saline wastewater volumes. A feature of the invention is utilizing the low pH wastewater to decrease the pH of bauxite residue, while simultaneously sequestering $CO_2$ and or $SO_2$ contained in flue effluent. An advantage of the invention is that saline wastewater produced from oil or gas well operations are reduced, both from an acidity standpoint and a volume standpoint.

Another object of the present invention is using bauxite residue and oil field brine mixtures to sequester acid gases such as carbon dioxide and sulfur dioxide. A feature of this invention is utilizing the bauxite residue as a caustic source while utilizing brine both as a source of calcium and magnesium ions to promote mineral carbonation and as a means of decreasing mixture viscosity to facilitate mass transfer and gas/slurry interaction. An advantage of the invention is a decrease in volumes of secondary waste streams generated by aluminum processing, oil/gas production, and combustion.

Still another object of the present invention is to provide an integrated process for utilizing a plurality of waste stream moieties as three reacting reagents in reducing the volume and environmental impact of the moieties. A feature of the invention is the capture and sequestration of both $CO_2$ and $SO_2$ from industrial gas byproduct streams, along with the concomitant treatment of bauxite residue and waste water brine. The advantages of this invention is the coincidental treatment of multiple industrial waste byproduct streams with little or no pretreatment of the streams necessary, thereby resulting in a low cost solution to dealing with the waste stream moieties.

The invention provides a method for sequestering $CO_2$ and or $SO_2$, the method comprising: using caustic bauxite tailings to increase the pH of brine fluid to above 7; and contacting the brine fluid with a second fluid containing acid gases for a time and at a temperature sufficient to mineralize the acid gases.

Also provided is a method to neutralize bauxite residue, the method comprising mixing the residue with waste water brine for a time and of a temperature sufficient to create a homogenous liquor; and contracting the liquor with a fluid containing combustion effluent for a time and at a temperature sufficient to decrease the pH of the residue by 40 percent.

DESCRIPTION OF THE DRAWING

Embodiments together with the above and other objects and advantages may best be understood from the following detailed description of the embodiment illustrated in the drawing, wherein:

FIG. 4 is a table of the results of the $CO_2$ and $SO_2$ sequestration method conducted at 20° C. and 140° C., in accordance with features of the present invention; and FIG. 5 is a table of the experimental parameters associated with the $CO_2$ and $SO_2$ sequestration method, in accordance with features of the present invention.

DETAILED DESCRIPTION OF THE INVENTION

Figure 1:
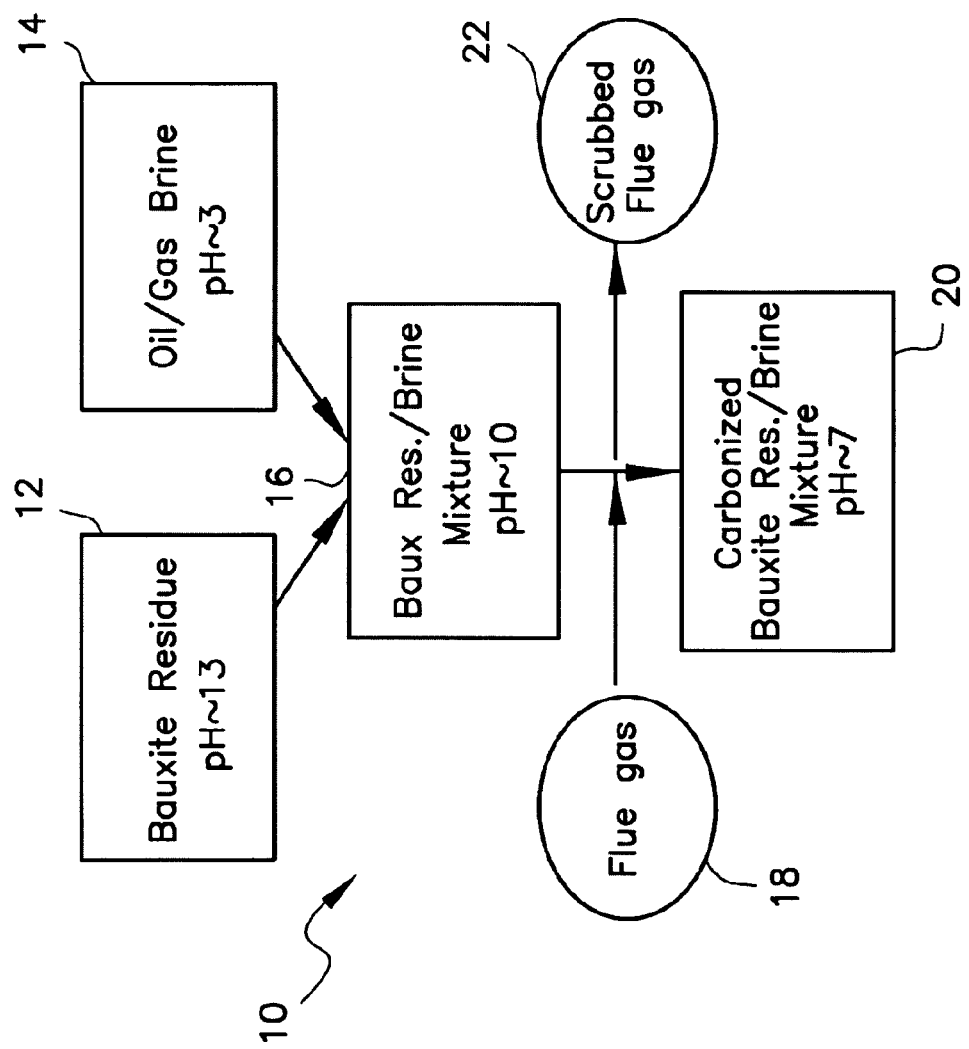
FIG. 1 is a schematic diagram of the invented method, in accordance with features of the present invention.

The invented process contemporaneously removes both $CO_2$ and $SO_2$ from effluent fluids. This represents a significant improvement in sequestration strategy because separation of $CO_2$ and $SO_2$ from bulk gaseous byproduct stream is not necessary prior to treatment. The invented, integrated use of bauxite residue/brine mixtures in the process provides a cost effective means of direct flue gas treatment and could be an attractive alternative for power plants located near bauxite residue tailings disposal sites. There is great interest from the aluminum industry to combine neutralization processes with $CO_2$ and $SO_2$ sequestration.

Specifically, the inventors found that mixtures of oil/gas wastewater brine and bauxite residue can effectively sequester acid gases, including, but not limited to, $CO_2$, $SO_2$, NO, $H_2S$, and HCl, through a combination of solubility and long-term mineral trapping. The invented bauxite residue/brine mixture has a high alkalinity that can be used for neutralizing acid gases as well as acid waste materials. In such scenarios, the bauxite residue/brine mixtures were lowered to pHs of between 12.5 and 8.6, or lower. Surprisingly and unexpectedly, the inventors found that mixing of bauxite residue and brine alone would not be effective to neutralize bauxite residue. Rather, the reactions with $CO_2$, $SO_2$ and/or combinations thereof, are necessary to achieve complete neutralization (i.e., reducing the residue's pH to 6-7) of the bauxite residue. Carbonization product pH drifts to approximately 10.6 (From an initial 12.5 to 013.5 pH) as a result of excess $CO_2$ carbonation in the absence of brine. The proposed treatment method neutralizes the bauxite residue reactant, reducing the potential impact of the caustic byproducts to the surrounding environment.

The inventors have found that conversion of gaseous $CO_2$ into stable carbonate minerals is largely a function of pH, with observed increase in sequestration capacity observed at higher initial fluid pH, as disclosed in Soong et al., *Energy Conversion and Management* 45, pp. 1845-59 (2004), and incorporated herein by reference.

The inventors found that the bauxite residue/brine mixtures are just as effective in sequestering $SO_2$ that is present in industrial flue gases. Thus, the process removes both $CO_2$ and $SO_2$ from the gas stream contemporaneously.

As a secondary benefit, the described brine/$CO_2$ neutralization of bauxite residue generates a much lower volume of brine wastewater than do previously proposed methods of mixing of seawater with bauxite residue. In addition, the use of produced saline wastewater from oil or gas wells means that there is no net increase in saline wastewater generated.

The invented process can be conducted at a myriad of conditions. Typical conditions include ambient pressure and temperature. Pressures from ambient to 900 psig are suitable. Temperatures from 20° C. to 140° C. are suitable. Typical duration of the process can range from 0.5 hours to 5.5 hours.

A simplified schematic of the treatment process is designated as numeral 10 in FIG. 1. A supply of bauxite residue 12 is procured from a myriad of secondary waste streams discussed supra (including, but not limited to aluminum processing centers, waste alkaline material sources generally, and fly ash producers such as large scale combustion and electricity generation facilities. No pretreatment such as sizing, grinding, solubilization or homogenizing of the bauxite residue is required. In its native state, the bauxite has a pH of between 13 and 13.5.

Wastewater brine 14 is mixed with the bauxite 12 to create a bauxite/brine mixture 16. Generally, the brine 14, which is also supplied in its untreated condition, has a pH of between 2.7 and 5.

Mixture occurs at ambient temperatures. Beginning process temperatures between 20° C. and 40° C. are suitable. Process temperatures are likely to change due to the exothermicity of the process. Mixing of the bauxite and brine occurs until an homogenous liquor is produced, whereby the liquor exhibits a pH of between 8.5 and 12.5, and most preferably 10.5.

After the liquor equilibrates, a waste effluent fluid 18, such as flue gas, containing carbon dioxide, sulfur dioxide or both is contacted with the liquor. A myriad of mixing protocols are suitable. In one such protocol, all of the reactants are splash blended via mixing speeds between 500 revolutions per minute (rpm) and 1500 rpms. Typical reactions times are 30 minutes. The liquor is allowed to continue to react for an additional 30 minutes to assure complete reaction.

Bubbling of the flue gas (oxides) through the bauxite/brine mixture under continuous conditions is another suitable method for combining the reactants. Continuous conditions comprise providing a continuous flow of flue gas through the bauxite residue/brine mixture at a temperature (e.g. ambient) and pressure (e.g. 10 psig) sufficient to facilitate gas flow through the reactor. In this instance, typical reaction times are between 1 and 2 hours for a 90/10 bauxite residue/brine mix and 70/30 bauxite residue/brine mix, respectively. Generally, contact of the fluid to the liquor continues for a time and at a pressure and temperature sufficient to cause the oxides to convert to carbonates 20, per Equations 4-6, infra. Generally, ambient temperature and pressures are suitable. However, flue gas temperatures of as high as 60° C. will suffice. This allows for the process to be utilized with minimal pretreatment of flue gas effluent.

Treated flue gas effluent 22 is then either vented to the atmosphere, recycled or else processed in another scrubbing method.

Dissolution of $CO_2$ in water results in the formation of carbonic acid ($H_2CO_3$) that dissociates to $HCO_3^-$ and $CO_3^=$ ions, releasing $H^+$ to the fluid:

$$CO_{2(g)} + H_2O \rightarrow H_2CO_{3(aq)} \quad \text{Equation 1}$$

$$H_2CO_{3(aq)} \rightarrow HCO_{3(aq)}^- + H^+(aq) \quad \text{Equation 2}$$

$$HCO_{3(aq)}^- \rightarrow CO_{3(aq)}^= + H^+_{(aq)} \quad \text{Equation 3}$$

Therefore, dissolution of $CO_2$ results in a decrease in pH. A decrease in pH is further enhanced when carbonate minerals precipitate from ions in solution via reactions such as:

$$Ca^{++} + CO_2 + H_2O \rightarrow CaCO_{3(s)} + 2H^+ \quad \text{Equation 4}$$

$$Mg^{++} + CO_2 + H_2O \rightarrow MgCO_{3(s)} + 2H^+ \quad \text{Equation 5}$$

$$Fe^{++} + CO_2 + H_2O \rightarrow FeCO_{3(s)} + 2H^+ \quad \text{Equation 6}$$

Thus, carbonate precipitation in the absence of buffered pH is limited by the generation of $H^+$ which acts to consume alkalinity, ultimately resulting in increased solubility of calcite and other carbonate minerals.

Some brines have a high concentration of Ca, Mg and Fe in addition to the dominant Na and Cl ions. Under favorable conditions (pH, temperature, pressure), the Ca, Mg and Fe from brine could react with $CO_2$ to ultimately produce $CaCO_3$ (s), $MgCO_3$ (s), $Fe_2CO_3$(s) and other mineral products that would safely and permanently store $CO_2$. As dictated by the carbonate system disclosed herein, a solution pH of 7.8 or higher achieves substantial dissolution of $CO_2$ and subsequent mineral carbonate formation. Therefore, to favor $CO_2$ dissolution and precipitation of mineral carbonates, the inventors have increased the pH of wastewater brine to make it a more viable reactant with greenhouse gas effluent. This fixes the pH at relatively high values in order to counteract the loss of alkalinity (production of $H^+$) during mineral precipitation and $CO_2$ dissolution.

$CO_2$ and Flue Gas $CO_2$

Treatment Protocol Detail

Figure 2:
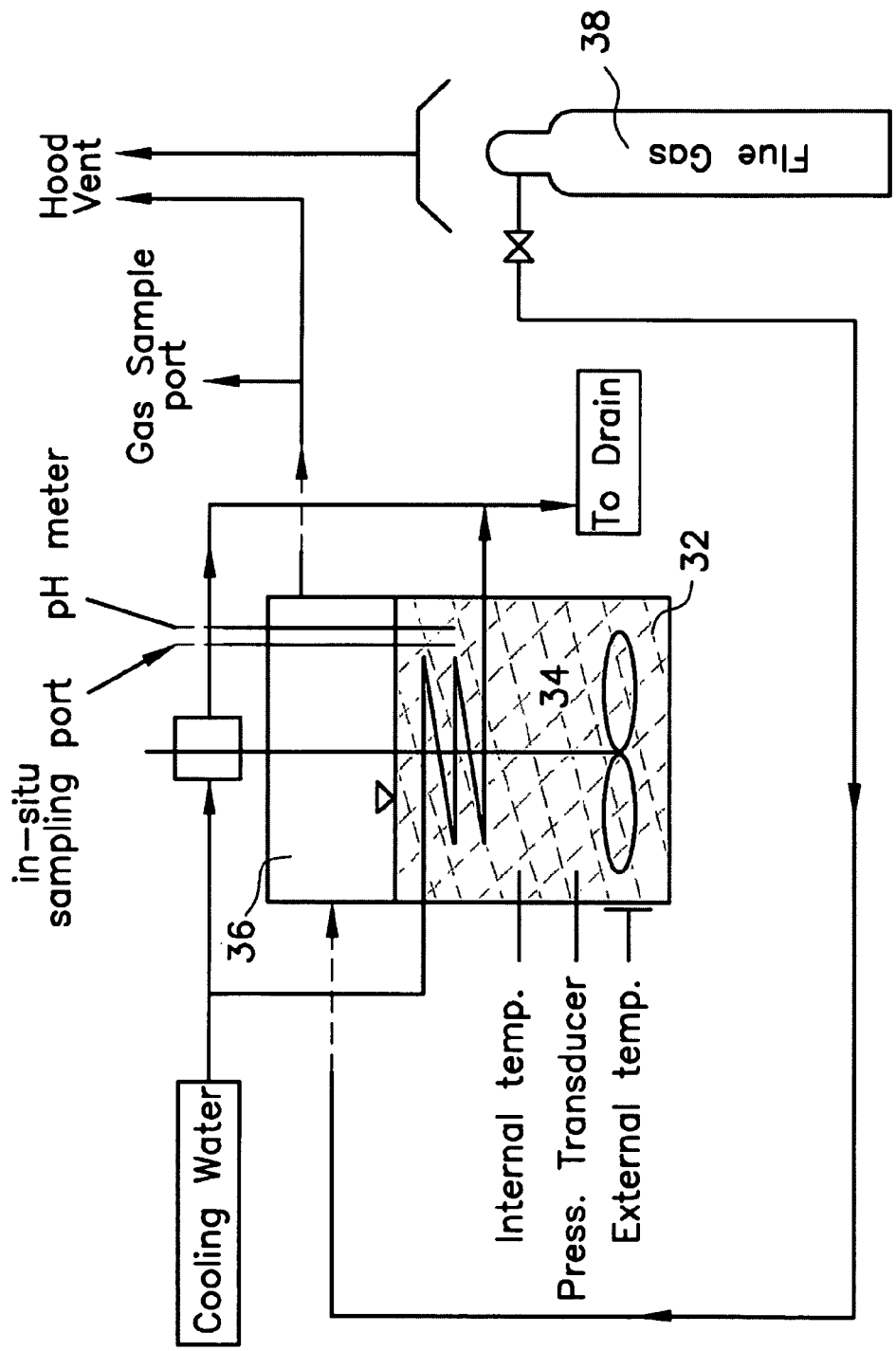
FIG. 2 is a schematic diagram of a system for utilizing three waste streams to sequester greenhouse gases, in accordance with features of the present invention.

The invented process treats the acid gas moiety as the limiting reagent, as such, as long as target pH values are attained, and the suitable cations are present in adequate concentrations, any concentration of $CO_2$, $SO_2$, and other acid gases can be carbonized and otherwise sequestered. For illustrative purposes only, data presented herein deal with $CO_2$ and $SO_2$, but the application of the invented process should not be relegated to these two species. Experiments were conducted in the laboratory via a bench top processor, so designated as numeral 30 in FIG. 2 whereby 15 percent by volume of the flue gas was $CO_2$. However, neat $CO_2$ streams, (i.e., 100 percent by volume $CO_2$, or substantially 100 percent by volume $CO_2$) are also treatable with the invented protocol.

Figure 3:
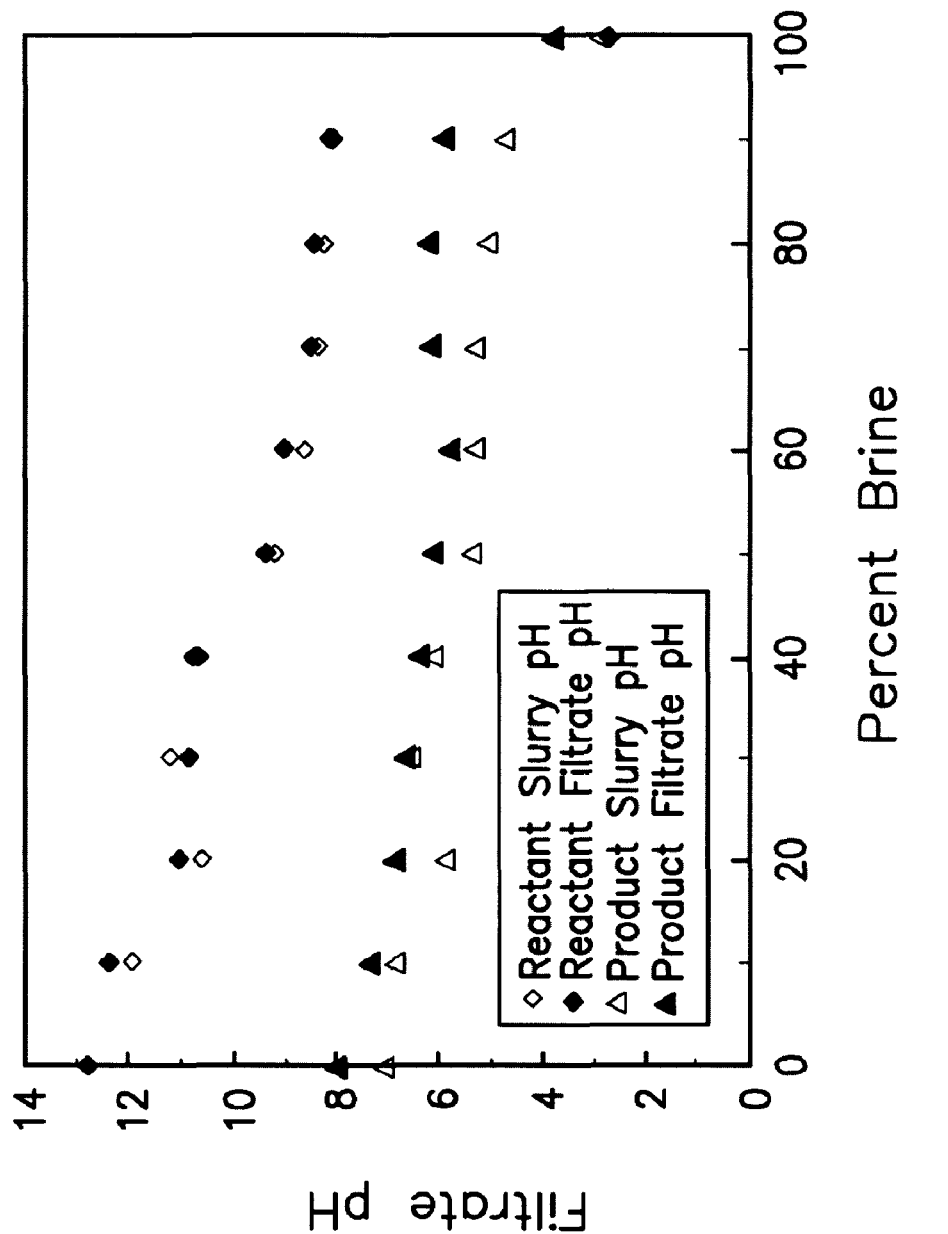
FIG. 3 is a graph showing percentages of reactants over time and their related pH values, in accordance with features of the present invention.

The experiments confirmed the efficiency of the invention to sequester $CO_2$ in bauxite residue/brine mixtures at a series of temperatures, $CO_2$ pressures, and brine/bauxite residue mixture ratios. Those ratios are depicted in FIG. 3. FIG. 3 shows the pH of bauxite residue/brine mixtures and $CO_2$ carbonated product in 10 percent increments by volume.

The experiment was conducted at room temperature with an initial $CO_2$ head space pressure of 100 psig, which translates into a 666 psig head space pressure of flue gas inasmuch as $CO_2$ comprises 15 volume percent of typical flue gas effluent. Suitable ratios of $CO_2$ to the bauxite residue-brine liquor are selected between 2 kg $CO_2$/kiloliter of liquor and 9 kg $CO_2$/kiloliter of liquor. Preferable ratios are between 3.5 and 7.9. Preferable ratios are selected empirically, depending on the sequestering conditions such as temperature and the bauxite residue/brine ratio. Pure $CO_2$ feed experiments and flue gas experiments indicate that the invented process can treat flue gas directly without costly separation of $CO_2$ from the effluent stream.

Bauxite residue/brine mixture carbonation experiments were carried out in a half-liter autoclave (Hastelloy C-276) manufactured by Progressive Equipment Corp., (element 32 in FIG. 2) and a similar one-liter autoclave reactor. The reactor 32 was loaded with 180 ml of premixed reactant (brine and bauxite residue mixture 34) and the head space 36 of the reactor was purged with 15 psig carbon dioxide three times to remove all room air from the head space. A prescribed initial pressure of $CO_2$ (element 38 in FIG. 2), typically 100 psig, was charged into the reactor to achieve the desired initial pressure. Valves were closed and the bauxite residue/brine-$CO_2$ mixture was agitated at a selected speed to prevent settling of precipitate during the experiments and promote $CO_2$ dissolution. Upon completion of each experiment, the slurry was cooled to room temperature, the remaining head space pressure noted, and the remainder vented. The slurry was removed from the reactor and filtered to separate the solids from the aqueous solution. A digital pH meter (Sentron-1001 pH) was used to determine the pH of the solution before and after reaction. A series of reactions (100 psig initial pressure, room temperature) were carried out across the full range of bauxite residue/brine mixtures in 10% by volume increments.

Carbonation experiments were carried out for approximately two hours after pressure stabilization was observed. Head space pressure stabilization was assumed to indicate that the reactor contents had achieved short-term equilibrium. In experiments using pure $CO_2$, the pressure change between the initial application and final equilibrium condition was used with initial and final system temperature to estimate the short-term capacity of the bauxite residue/brine mixture to sequester $CO_2$, assuming ideal behavior of gas under the applied conditions.

The inventors found that the capacity of reactant mixtures to absorb $CO_2$ is primarily a function of reactant mixture pH. Carbonation capacity decreases at lower pH (i.e., with decreasing mixture bauxite residue concentration and increasing mixture brine concentration). The rate of $CO_2$ dissolution in the reactive mixture was observed to decrease with increasing bauxite residue composition (increasing brine), when mixed at 500 RPM as was done for all batch experiment described herein. This illustrates that the increasing mixture viscosity with increasing bauxite residue composition requires an increased total energy input to achieve complete $CO_2$ gas reaction. Thus, the inventors have further discovered the benefit of mixing brine with bauxite residue to minimize viscosity and therefore facilitate slurry reaction and conveyance.

Pure $CO_2$ carbonation of brine/bauxite residue in mixtures with as little as 20% brine can be fully and permanently neutralized. In contrast, neutralization of bauxite residue with brine only (i.e., without $CO_2$ and $SO_2$ addition) can require mixtures with brine composition greater than 95%, as described earlier. Comparison with the currently employed technique of batch carbonation of pure bauxite residue slurry using pure $CO_2$ shows the advantages of the invented treatment method. In the currently employed method, bauxite residue pH initially dropped from 13 to between 8 and 8.5 by direct carbonation. However, following treatment, the pH rises back to between 10 and 11 as a combined result of partial decarbonation and slower reaction with solid-phase alkalinity. Results shown in FIG. 3 show that, while initial bauxite residue/brine mixtures do not achieve neutralization, carbonation of bauxite residue/brine mixtures regularly results in complete product neutralization for most of the carbonation reactions.

Analyses of reactant and product ionic concentrations provided insight into the initial leachability of constituents of concern, and the potential environmental impact of the treated product on the environment as compared to the individual reactants and the bauxite residue/brine mixture. In the short term, calcium, strontium, and sodium concentrations do not appear to change in reactant mixtures as a result of $CO_2$ carbonation. As illustrated in FIG. 3, high percent bauxite residue reactant mixtures (up to 60%) have a relatively high pH (between 10.5 and 11). In this pH range, magnesium ion present as a result of brine addition rapidly precipitates as magnesium hydroxide. However, following reactant mixture carbonation, overall solution pH drops and magnesium hydroxide is redissolved.

$SO_2$ and Flue Gas $SO_2$
Treatment Protocol Detail

In addition to carbon sequestration efficacy of bauxite residue slurries, and the bauxite residue slurry neutralizing capacity of $CO_2$ from the industrial byproduct gas stream, caustic bauxite residue/brine mixtures are also effective in sequestering $SO_2$ that is present in industrial flue gases. The method is suitable to mineralize effluent wherein $SO_2$ is present at between 100 parts per million (ppm) and 1,000 ppm. Typical effluent concentrations of $SO_2$ are about 540 ppm.

Initially, $SO_2$ dissolves readily in water. Following dissolution, the $SO_{2(aq)}$ dissociates and speciates according to the solution conditions and the sulfurous acid cycle. Reaction with calcium ions will result in calcium sulfite formation. Partial oxidation of sulfite or bisulfite to sulfate will also allow formation of calcium sulfate and precipitation of mineral gypsum. These reactions are summarized below.

$$SO_{2(g)} = SO_{2(aq)}$$

$$SO_2 + H_2O = H^+ + HSO_3^-$$

$$HSO_3^- + \tfrac{1}{2}O_2 = SO_4^= + H^+$$

$$HSO_3^- + Ca^{++} = CaSO_{3(s)} + H^+$$

$$SO_3^= + Ca^{++} = CaSO_{3(s)}$$

$$SO_4^= + CaSO_{3(s)} = CaSO_{4(s)} + SO_3^=$$

$$SO_4^= + Ca^{++} = CaSO_{4(s)}$$

Caustic bauxite residue serves as an effective caustic reagent to promote $SO_2$ absorption. This treatment removes both $CO_2$ and $SO_2$ from the gas stream simultaneously. This represents a significant improvement in sequestration strategy because separation of $CO_2$ and $SO_2$ is not necessary prior to bauxite residue/brine mixture carbonation.

Bauxite residue contains significant quantities of iron oxide, suggesting that similar reactions may occur. $SO_2$ in the gas mixture reduces $Fe^{+++}$ to $Fe^{++}$ which then results in the formation of $FeCO_3$ (siderite) and $FeS_2$ (pyrite). Moreover, Ca in the bauxite residue/brine mixture will allow formation of calcium sulfite/sulfate.

Flue gas experiments (3.73% $O_2$, 80.69% $N_2$, 15.53% $CO_2$, 542 ppm $SO_2$) were conducted in a 1 liter autoclave reactor with various brine/bauxite residue ratio at a constant stirring speed of 1,500 rpm at different temperatures (20 and 140° C.) and reaction time of 1 to 5 hrs. The results are described in FIGS. 4 and 5. These results demonstrate that $SO_2$ can be effectively absorbed These results demonstrate that $SO_2$ can be effectively absorbed into bauxite residue/brine at 20° C. (Run #405, 95.3% $SO_2$ removal), and yet more complete when mixed with bauxite residue slurries at higher temperature of 140° C. (Runs #408, and 409, 99.9% in both cases). The $SO_2$ sequestering capacity of bauxite residue slurry/brine mixtures is comparable to that of pure bauxite residue slurry (Run #407, 99.9%), but the volume of mixture available for treatment using such mixtures would be greater as a result of bauxite residue dilution in brine. This demonstrates that reacting mixtures of bauxite residue slurry and brine with $SO_2$-bearing industrial waste gasses is an improvement over treatment of such gasses with pure bauxite residue or pure brine alone.

All runs except Run #410 were conducted with a simulated flue gas that contained both $SO_2$ and $CO_2$, and so all described $SO_2$ removal occurred coincidentally with $CO_2$ sequestration. $CO_2$ capture is greatest in mixtures of bauxite residue slurry and brine. In comparison, those reactions including bauxite residue liquid (no slurry solids) and brine (Runs #405, 406) at 20° C. had roughly half the $CO_2$ bearing capacity of the bauxite residue slurry/brine mixtures that were directly reacted with simulated flue gas at 140° C. (Runs #408, 409). These bauxite residue slurry/brine mixtures had greater capacity than even that of the pure bauxite residue slurry (Run #407); evidence of a symbiotic interaction between bauxite residue slurry/brine in the mixture. This data shows that mixtures of bauxite residue slurry and brine have demonstrated advantages over single component reaction for both the sequestration of $CO_2$ and $SO_2$ in mixed industrial byproduct gas streams.

Furthermore, the heretofore caustic and acid waste streams associated with bauxite residues (pH 12.5 to 13.5) and wastewater brine (pH 3 to 5) respectively, are effectively neutralized after participating as reactive reagents in the invented process such that the resulting brine/bauxite residue liquor has a pH of between 9 and 12 prior to reaction with acid gas moieties and a pH of between 5.5 and 7.5 after reaction with acid gas moieties.

The final product, that is the fully neutralized bauxite residue/brine mixture treated with and containing sequestered, mineralized acid gas has a pH of between approximately 6 and 7.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

The embodiment of the invention in which an exclusive property or privilege is claimed is defined as follows:

1. A method to neutralize bauxite residue, the method comprising:
    a) mixing the residue with waste water brine for a time and temperature sufficient to create a homogenous liquor; and
    b) contracting the liquor with a fluid containing combustion effluent for a time and at a temperature sufficient to decrease the pH of the residue by 40 percent.

2. The method as recited in claim 1 wherein the combustion effluent contains acid gases selected from the group consisting of $CO_2$, $SO_2$, NO and combinations thereof.

3. The method as recited in claim 1 wherein the effluent contains $CO_2$ at between 5 and 100 volume percent.

4. The method as recited in claim 1 wherein the effluent contains $CO_2$ at between 10 and 40 volume percent.

5. The method as recited in claim 1 wherein 15 volume percent of the effluent comprises $CO_2$.

6. The method as recited in claim 1 wherein the effluent contains $SO_2$ at concentrations of between 100 ppm and 1,000 ppm.

7. The method as recited in claim 1 wherein the effluent contains 540 ppm $SO_2$.

* * * * *